United States Patent [19]

Tomaschke

[11] Patent Number: 5,246,587
[45] Date of Patent: Sep. 21, 1993

[54] INTERFACIALLY SYNTHESIZED REVERSE OSMOSIS MEMBRANES AND PROCESSES FOR PREPARING THE SAME

[75] Inventor: John E. Tomaschke, San Diego, Calif.

[73] Assignee: Hydranautics, San Diego, Calif.

[21] Appl. No.: 887,113

[22] Filed: May 19, 1992

Related U.S. Application Data

[63] Continuation of Ser. No. 812,323, Dec. 23, 1991, abandoned.

[51] Int. Cl.$^5$ ............................................. B01D 61/02
[52] U.S. Cl. .............................. 210/654; 210/500.38
[58] Field of Search .................. 210/654, 490, 500.38; 427/244, 245, 246; 264/41, 49, 45.1

[56] References Cited

U.S. PATENT DOCUMENTS

| | | | |
|---|---|---|---|
| 3,904,519 | 9/1975 | McKinney, Jr. et al. | 210/23 |
| 3,996,318 | 12/1976 | van Heuven | 264/5 |
| 4,230,463 | 10/1980 | Henis et al. | 55/16 |
| 4,277,344 | 7/1981 | Cadotte | 210/654 |
| 4,520,044 | 5/1985 | Sundet | 427/244 |
| 4,529,646 | 7/1985 | Sundet | 428/315.5 |
| 4,544,484 | 10/1985 | Sundet | 264/41 X |
| 4,619,767 | 10/1986 | Kamiyama et al. | 210/490 |
| 4,626,468 | 12/1986 | Sundet | 428/315.5 |
| 4,643,829 | 2/1987 | Sundet | 210/500.33 |
| 4,661,254 | 4/1987 | Zupancic | 210/490 |
| 4,749,488 | 6/1988 | Arthur et al. | 210/490 |
| 4,761,234 | 8/1988 | Uemura et al. | 210/500.38 |
| 4,783,346 | 11/1988 | Sundet | 427/244 |
| 4,828,708 | 5/1989 | Bray | 210/654 |
| 4,872,984 | 10/1989 | Tomaschke | 210/500.38 |
| 4,948,507 | 8/1990 | Tomaschke | 210/500.38 |
| 5,019,264 | 5/1991 | Arthur | 210/500.37 |
| 5,085,777 | 2/1992 | Arthur | 210/500.38 |
| 5,160,619 | 11/1992 | Yamaguchi | 210/500.38 |

OTHER PUBLICATIONS

J. E. Cadotte, "Evolution of Composite Reverse Osmosis Membranes," *Material Science of Synthetic Membranes*, Chapter 12, pp. 273-294, American Chemical Society Symposium Series (185).

S. D. Arthur, "Structure-Property Relationship in a Thin Film Composite Reverse Osmosis Membrane," *Journal of Membrane Science*, 46:243-260, Elsevier (1989).

*Primary Examiner*—Frank Spear
*Attorney, Agent, or Firm*—Panitch Schwarze Jacobs & Nadel

[57] ABSTRACT

Water permeable reverse osmosis membranes are prepared by interfacially polymerizing on a microporous support an essentially monomeric polyamine reactant having at least two amine functional groups per reactant molecule, and an essentially monomeric, at least trifunctional cyclic chloroformate amine-reactive reactant, wherein at least one of the functional groups is a chloroformyl group and the remaining functional groups of the amine-reactive reactant, if any, are acyl halides. The polymerization is preferably carried out in the presence of a monomeric amine salt, which increases the flux rate of the resulting membrane. In addition, an aromatic polyfunctional acyl halide and/or a polyfunctional cycloaliphatic acyl halide may be used in conjunction with the cyclic chloroformate in order to increase flux rates and possibly other desired properties. A preferred cyclic chloroformate is 5-chloroformyl isophthaloylchloride.

31 Claims, No Drawings

INTERFACIALLY SYNTHESIZED REVERSE OSMOSIS MEMBRANES AND PROCESSES FOR PREPARING THE SAME

CROSS-REFERENCE TO RELATED APPLICATION

This application is a continuation of U.S. patent application Ser. No. 07/812,323, filed Dec. 23, 1991, now abandoned.

FIELD OF THE INVENTION

The present invention relates to interfacially synthesized reverse osmosis membranes useful for the separation of fluid mixtures and solutions. In particular, the present invention is directed to water permeable membranes which are useful for desalination of an aqueous solution. The present invention also relates to processes for preparing the membranes.

BACKGROUND OF THE INVENTION

It is known that dissolved substances can be separated from their solvents by the use of selective membranes. For example, of great practical interest is the removal of salt from water by reverse osmosis. The efficiency and economy of such removal is of tremendous economic significance in order to provide potable water from brackish or sea water for household or agricultural use. A critical factor in desalination is the performance of the membrane in terms of salt rejection, i.e., the reduction in salt concentration across the membrane, and flux, i.e., the flow rate across the membrane. For practical applications, the flux should be on the order of greater than about 10 gallons/ft$^2$-day (gfd) at a pressure of about 55 atmospheres for sea water and about 15 gfd at a pressure of about 15 atmospheres for brackish water. More preferably, commercial applications now require fluxes greater than about 25 gfd (about 1.0 m$^3$/m$^2$-day) at a pressure of about 15 atmospheres for brackish water. Moreover, salt rejections greater than 99% are required. The continuing goal of research and development in this area is to develop membranes having increased flux and/or salt rejection which are useful in desalination.

Among the known membranes used in desalination are included a large number of various types of polyamides which are prepared by a variety of methods. Of particular interest within this broad group of polyamide membranes are crosslinked aromatic polyamide membranes. The crosslinked aromatic polyamide membranes include, for example, those disclosed in the following U.S. patents.

U.S. Pat. No. 3,904,519, issued to McKinney et al., discloses reverse osmosis membranes of improved flux prepared by crosslinking aromatic polyamide membranes using crosslinking agents and/or irradiation. The polyamides are prepared, for example, by the interfacial polymerization of amine groups and carboxyl groups followed by crosslinking.

U.S. Pat. No. 3,996,318, issued to van Heuven, teaches the production of aromatic polyamide membranes, wherein crosslinking is achieved using a reactant having a functionality of three or greater.

U.S. Pat. No. 4,277,344, issued to Cadotte, describes a reverse osmosis membrane which is the interfacial reaction product of an aromatic polyamine having at least two primary amine substituents with an aromatic acyl halide having at least three acyl halide substituents. The preferred membrane is made of a poly(phenylenediamine trimesamide) film on a porous polysulfone support.

U.S. Pat. No. 4,828,708, issued to Bray, discloses a similar membrane in which a major portion of the trifunctional aromatic acyl halide is replaced by the difunctional aromatic acyl halide, i.e., isophthaloylchloride.

U.S. Pat. No. 4,529,646, issued to Sundet, shows a membrane similar to U.S. Pat. No. 4,277,344 in which all or a portion of the trifunctional aromatic acyl halide is replaced by cyclohexane-1,3,5-tricarbonyl chloride. Similar membranes are disclosed in U.S. Pat. Nos. 4,520,044; 4,544,484; 4,626,468; 4,643,829; and 4,783,346, each issued to Sundet.

U.S. Pat. No. 4,761,234, issued to Uemura et al., shows a membrane similar to U.S. Pat. No. 4,277,344 in which aromatic tri- or higher aromatic amines are employed U.S. Pat. No. 4,661,254, issued to Zupanic et al., discloses a reverse osmosis composite membrane formed by the interfacial polymerization of a triaryl triamine with an aromatic carboxylic acid chloride.

U.S. Pat. No. 4,619,767, issued to Kamiyama et al., describes membranes prepared by crosslinking polyvinyl alcohol and secondary di- or higher amines with polyfunctional crosslinking agents. Both aromatic and aliphatic amine components are disclosed.

U.S. Pat. No. 4,749,488, issued to Arthur et al., discloses membranes of polyphenylene tetrahydrofuran-2,3,4,5-tetracarboxamide which may also include isophthalamide or terephthalamide units.

U.S. Pat. Nos. 4,872,984 and 4,948,507, issued to the same inventor as the present application, describe the interfacial synthesis of reverse osmosis membranes from an essentially monomeric polyamine having at least two amine functional groups and an essentially monomeric polyfunctional acyl halide having at least about 2.2 acyl halide groups per reactant molecule, in the presence of a monomeric amine salt. Both aromatic and aliphatic polyamines and polyfunctional acyl halides are disclosed.

U.S. Pat. No. 5,019,264, issued to Arthur, discloses a membrane which comprises a polyamideurea separating layer in contact with a polysulfone substrate. The polyamideurea includes some amide linkages which are formed from an amine-reactive component having at least one acyl halide group.

Interesting reviews and comparisons of various composite reverse osmosis membranes are included in J. E. Cadotte, "Evolution of Composite Reverse Osmosis Membranes," *Materials Science of Synthetic Membranes* Chapter 12, pp. 273-294, American Chemical Society Symposium Series (1985) and S. D. Arthur, "Structure-Property Relationship in a Thin Film Composite Reverse Osmosis Membrane," *Journal of Membrane Science*, 46:243-260, Elsevier (1989).

While some of the above-referenced membranes are commercially useable, the goal of the industry continues to be to develop membranes that have better flux and salt rejection characteristics in order to reduce costs and increase efficiency of operation.

SUMMARY OF THE INVENTION

Accordingly, an object of the present invention is to provide an interfacially synthesized reverse osmosis membrane which has high salt rejection and excellent flux.

This and other objects of the present invention, which will be apparent from the detailed description of the present invention provided hereinafter, have been met by a water permeable membrane prepared by interfacially polymerizing on a microporous support (1) an essentially monomeric polyamine reactant having at least two amine functional groups, and (2) an essentially monomeric, at least trifunctional cyclic chloroformate amine-reactive reactant, wherein at least one of the functional groups is a chloroformyl group and the remaining functional groups of the amine-reactive reactant, if any, are acyl halides.

In a preferred embodiment of the present invention, the above interfacial polymerization is carried out in the presence of a monomeric amine salt by either (a) a solution containing both a monomeric amine salt and a polyamine being coated on a microporous support prior to coating with a solution of a cyclic chloroformate, or (b) a monomeric amine salt solution being coated on a microporous support prior to coating with a polyamine solution and a cyclic chloroformate solution.

In another preferred embodiment, up to about 92 weight percent of the cyclic chloroformate reactant is replaced by at least one essentially monomeric, aromatic polyfunctional acyl halide having a functionality of at least two, such as isophthaloylchloride, trimesoyl chloride, and/or terephthaloyl chloride; and/or by at least one polyfunctional single ring cycloaliphatic acyl halide, such as 1,2,3,4-cyclobutane tetracarboxylic acid halide, 1,2,3-cyclobutane tricarboxylic acid halide, 1,2,3,4-cyclopentane tetracarboxylic acid halide, 1,2,4-cyclopentane tricarboxylic acid halide, or cyclohexane-1,3,5-tricarbonyl chloride.

The resulting polymerizations yield ultrathin membranes on the microporous support. These membranes have excellent salt rejection and flux and are suitable for desalination applications.

DETAILED DESCRIPTION OF PREFERRED EMBODIMENTS

The membranes of the present invention contain urethane linkages and may also contain amide linkages. The membranes may be formed by various methods of interfacial polymerization, a number of which are known in the art. Presently preferred are the methods described in my prior U.S. Pat. Nos. 4,872,984 and 4,948,507, the disclosures of which are incorporated herein by reference. While the present invention will now be described herein with reference to the preferred method in which the polymerization is carried out in the presence of a monomeric amine salt, it will be understood that the following methods could be carried out without the presence of the monomeric amine salt, which is used in the methods of my prior above-mentioned patents.

In one embodiment, the objects of the present invention have been met by a water permeable membrane produced by the process comprising the steps of:

(a) coating a microporous support with an aqueous solution comprising (i) an essentially monomeric polyamine reactant having at least two amine functional groups and (ii) a monomeric amine salt, to form a liquid layer on said microporous support; organic solvent solution of an essentially monomeric amine-reactive reactant comprising an at least trifunctional cyclic chloroformate, or mixture thereof, wherein at least one of the functional groups is a chloroformyl group and the remaining functional groups of the amine-reactive reactant, if any, are acyl halides; and (c) drying the product of step (b) so as to form said water permeable membrane.

In a second embodiment, the water permeable membrane is produced by the process comprising the steps of:

(a) coating a microporous support with a first aqueous solution comprising a monomeric amine salt to form a monomeric amine salt layer on said microporous support;

(b) coating said monomeric amine salt layer with a second aqueous solution comprising an essentially monomeric polyamine reactant having at least two amine functional groups to form a liquid layer on said monomeric amine salt layer;

(c) coating said liquid layer with an organic solvent solution of an essentially monomeric amine-reactive reactant, comprising an at least trifunctional cyclic chloroformate, or mixture thereof, wherein at least one of the functional groups is a chloroformyl group and the remaining functional groups of the amine-reactive reactant, if any, are acyl halides; and (d) drying the product of step (c) so as to form said water permeable membrane.

The particular microporous support employed in the present invention is not critical thereto. Examples of such microporous supports useful in the present invention include those made of a polyarylether sulfone, such as a polysulfone and a polyether sulfone; a polyimide; or a polyvinylidene fluoride. The microporous support is preferably made of a polyarylether sulfone. The thickness of the microporous support is not critical to the present invention. Generally, the thickness of the microporous support is about 25 to 125 um, preferably about 40 to 75 um.

The essentially monomeric polyamine reactant employed in the present invention has at least two amine functional groups, preferably 2 to 3 amine functional groups, per molecule. The amine functional group is a primary or secondary amine functional group, preferably a primary amine functional group. The polyamine reactant may be aromatic or cycloaliphatic.

The particular polyamine reactant employed in the present invention is not critical thereto. Examples of such polyamine reactants include aromatic primary diamines, such as m-phenylenediamine and p-phenylenediamine and substituted derivatives thereof, wherein the substitutent includes, e.g., an alkyl group, such as a methyl group or an ethyl group; an alkoxy group, such as a methoxy group or an ethoxy group; a hydroxy alkyl group; a hydroxy group or a halogen atom; aromatic primary triamines, such as 1,2,4-triaminobenzene; aromatic secondary diamines, such as N,N'-diphenylethylene diamine; cycloaliphatic primary diamines, such as cyclohexane diamine; cycloaliphatic secondary diamines, such as piperazine and trimethylene dipiperidine; and xylylene diamines, such as m-xylylene diamine. The preferred aromatic polyamine reactants employed in the present invention are aromatic primary diamines, more preferably m-phenylenediamine (MPD).

The amine-reactive reactant used in the present invention is an essentially monomeric, at least trifunctional cyclic chloroformate, or a mixture of such chloroformates, wherein at least one of the functional groups is a chloroformyl group and the remaining functional groups of the amine-reactive reactant, if any, are acyl halides. The nucleus of the cyclic chloroformate is selected from the group consisting of aromatic, heterocyclic and cycloaliphatic nuclei and mixtures thereof. The cyclic chloroformate can have a single or multi-ring nucleus. Preferably, the nucleus is a four, five or six-membered single ring. Examples of such amine-reactive reactants include the aromatics 5-chloroformyl isophthaloylchloride (5CFIPC), 4-chloroformyl isophthaloylchloride, 3,5-dichloroformyl benzoylchloride and 1,3,5-phenyltrichloroformate (PTCF), cyclobutane, cyclopentane or cyclohexane chloroformates, and the heterocyclic triazine chloroformates. A preferred aromatic chloroformate for use in the present invention is 5CFIPC.

A method of preparation of 5CFIPC, as described more fully below in Preparation Example A, comprises a first step of reacting phosgene with 5-hydroxy isophthalic acid and N,N-dimethylacetamide and a second step of reacting the product of step 1 with N,N-dimethylaniline in an organic solvent, followed by filtering and solvent extraction.

A method of preparation of PTCF, as described more fully below in Preparation Example B, comprises reacting phosgene with phloroglucinol at basic pH followed by filtering and solvent extraction.

In addition to the at least trifunctional cyclic chloroformate reactant described above, the amine-reactive reactant may also include in admixture with the chloroformate an essentially monomeric polyfunctional aromatic acyl halide having at least about two acyl halide groups per reactive molecule and/or a polyfunctional single ring cycloaliphatic acyl halide. That is, up to about 92 weight percent, and preferably about 0 to 70 weight percent, of the chloroformate may be substituted with one or more aromatic acyl halides and/or cycloaliphatic acyl halides in order to increase flux and possibly other desired properties.

Examples of such aromatic acyl halides include isophthaloyl halide, trimesoyl halide, terephthaloyl halide, and mixtures thereof. The preferred aromatic acid halides employed in the present invention with the trifunctional cyclic chloroformate are isophthaloylchloride (IPC), trimesoyl chloride (TMC) and/or terephthaloyl chloride (TPC).

Examples of such cycloaliphatic acyl halides include 1,2,3,4-cyclobutane tetracarboxylic acid halide, 1,2,3-cyclobutane tricarboxylic acid halide, 1,2,3,4-cyclopentane tetracarboxylic acid halide, 1,2,4-cyclopentane tricarboxylic acid halide, cyclohexane-1,3,5-tricarbonyl halide and mixtures thereof. The preferred cycloaliphatic acyl halides employed in the present invention with the trifunctional cyclic chloroformate are 1,2,3,4-cyclopentane tetracarboxylic acid chloride (CPTC), 1,2,4-cyclopentane tricarboxylic acid chloride, 1,2,3,4-cyclobutane tetracarboxylic acid chloride (CBTC), and cyclohexane-1,3,5-tricarbonyl chloride.

Methods of making polyfunctional single ring cycloaliphatic acyl halides are known in the art, for example from *New Experimental Chemistry Lectures, Vol.* 14, pp. 1106–1108, edited by the Japan Chemistry Association. Methods of preparation of CPTC and CBTC comprise reacting a cycloaliphatic polycarboxylic acid with phosphorous pentahalide in an organic solvent with heat, stirring and reflux, followed by filtering and solvent extraction as disclosed in my copending U.S. application Ser. No. 07/744,194.

The monomeric amine salt employed in the present invention may be a salt of a monomeric amine and an acid, and is preferably a salt of a tertiary amine and a strong acid. As used herein, a strong acid is an acid which reacts essentially completely with water to give a hydronium ion. Examples of such strong acids include an aromatic sulfonic acid; an aliphatic sulfonic acid; a cycloaliphatic sulfonic acid, such as camphorsulfonic acid; trifluoroacetic acid; nitric acid; hydrochloric acid; and sulfuric acid.

The particular monomeric amine salt employed in the present invention is not critical thereto and may be any aliphatic, alkoxy, cycloaliphatic, heterocyclic or alkanol monomeric amine salt. Preferred monomeric amine salts employed in the invention are represented by formulas (I) and (II) below:

wherein $R_1$, $R_2$, $R_3$ and $R_4$, which may be the same or different, each represents a hydrocarbon; X represents a member selected from the group consisting of a halide, a nitrate, a sulfate, a phosphate, a sulfonate, a carboxylate, a halogenated carboxylate and an oxygenated haloacid derivative; and HX represents a strong acid which forms a water soluble salt with

In formula (I), the hydrocarbons represented by $R_1$, $R_2$ and $R_3$ preferably have a total number of carbon atoms of 3 to 9, more preferably, 3 to 6. In formula (II), the hydrocarbons represented by $R_1$, $R_2$, $R_3$ and $R_4$ preferably have a total number of carbon atoms of 4 to 16, more preferably, 4 to 13. The hydrocarbon may be, e.g., a straight or branched chain, substituted or unsubstituted alkyl group, alkoxy group, alkanol group or benzyl group. Further, in formula (I), two or more of $R_1$, $R_2$ and $R_3$ may combine together to form a ring.

More preferably, the monomeric amine salt employed in the present invention is a water soluble salt of a strong acid and a tertiary amine selected from the group consisting of a trialkylamine, such as trimethylamine, triethylamine, tripropylamine; an N-alkylcycloaliphatic amine, such as 1-methylpiperidine; an N,N-dialkylamine, such as N,N-dimethylethylamine and N,N-diethylmethylamine; an N,N-dialkyl ethanolamine, such as N,N-dimethylethanolamine; a bicyclic tertiary amine, such as 3-quinuclidinol and mixtures thereof, or a quaternary amine selected from at least one member of the group consisting of a tetraalkylammonium hydroxide, such as, tetramethylammonium hydroxide, tetraethylammonium hydroxide, and tetrapropylammonium hydroxide; a benzyltrialkylammonium hydroxide, such as benzyltrimethylammonium hydroxide, benzyltriethylammonium hydroxide, and benzyltripropylammonium hydroxide; and mixtures thereof. A particularly preferred monomeric amine salt is the amine salt of triethylamine and camphorsulfonic acid (TEACSA).

The monomeric amine salt is employed either as a solid, which is water soluble, or as an aqueous solution having dissolved therein the monomeric amine salt. The monomeric amine salt is preferably employed as an aqueous solution thereof. The monomeric amine used to prepare the monomeric amine salt preferably has a pKa of more than about 8, more preferably about 8 to 13, most preferably about 9 to 13.

In one embodiment of the present invention, the microporous support is coated with a first aqueous solution containing generally about 0.25 to 10.0 wt % of a monomeric amine salt, preferably about 1.0 to 8.0 wt % of a monomeric amine salt. The first aqueous solution is preferably adjusted to a pH of about 5.5 to 13, more preferably about 6 to 12, by controlling the concentration of the acid or the monomeric amine. In this case, the second aqueous solution containing the polyamine reactant generally has a pH of about 5 to 12, preferably about 6 to 12. Further, in this case, where the monomeric amine salt and the polyamine reactant are separately coated on the microporous support, the coating amount is generally adjusted so that the molar ratio of the monomeric amine salt to the polyamine reactant is about 0.1 to 4.0, preferably about 0.3 to 1.4.

In order to save a step in the process of the present invention, the above aqueous solution of the monomeric amine salt can also contain the polyamine reactant. In this case the aqueous solution is generally adjusted to a pH of about 5.5 to 13, preferably about 6 to 12. Further, in this case, the molar ratio of the monomeric amine salt to the polyamine reactant is also generally adjusted to about 0.1 to 4.0, preferably about 0.3 to 1.4.

The choice of pH depends on the base strength of the particular reactive polyamine employed. In general, the above-described lower range pH value of the reactive polyamine solution should be about the same as the pKa of the particular polyamine employed and the higher range pH value should be about the same as the particular unadjusted free base aqueous pH. In the case of aromatic polyamines, the pKa is in the range of about 4 to 7, whereas with cycloaliphatic polyamines, the pKa is in the range of about 8 to 11.

The above aqueous solutions are coated by any well known means, such as dipping, spraying, roller coating, rod coating or cloth sheet coating and allowed to remain in place generally for about 5 seconds to 10 minutes, preferably about 20 seconds to 4 minutes.

If desired, the aqueous solutions may contain a surfactant for more improved results. The particular surfactant employed in the present invention is not critical thereto. Examples of such surfactants include sodium dodecyl benzene sulfonate (SDBS), sodium dodecyl sulfate, sodium lauryl sulfate or mixtures thereof. The surfactants are generally employed at a concentration of about 0.01 to 0.5 wt %, preferably about 0.1 to 0.25 wt %.

After forming a liquid layer containing the monomeric amine salt and the polyamine reactant, a second layer of an organic solvent solution containing the essentially monomeric amine-reactive reactant(s) is coated thereon. Generally, the organic solvent solution contains about 0.05 to 5.0 wt/vol %, preferably about 0.07 to 0.7 wt/vol % of the amine-reactive reactant(s). It is preferable to employ an about 5 to 200, preferably an about 20 to 150, molar excess of the polyamine reactant to the amine-reactive reactant(s).

The organic solvent employed in the present invention is one which is non-miscible with water. The particular organic solvent employed in the present invention is not critical thereto. Examples of such organic solvents include alkanes, such as hexane and nonane; cycloalkanes, such as cyclohexane; and halogenated derivatives thereof, such as FREON ® (E.I. duPont de Nemours), including 1,1,2-trichlorotrifluoroethane; and mixtures thereof. The preferred organic solvents employed in the present invention are alkanes having from 6 to 12 carbon atoms.

The organic solvent containing the amine-reactive reactant is coated by any well known means, such as dipping or spraying, and allowed to remain in place generally for about 3 seconds to 20 minutes, preferably about 5 seconds to 30 seconds.

After each step of coating the aqueous and organic solvent solutions, the excess solutions are removed. Then, after the last coating and draining step, the resulting product is dried to form a water permeable membrane. The resulting product is generally dried in an oven at about room temperature to 130° C., preferably about 70° to 125° C. for about 1 to 10 minutes, preferably about 2 to 8 minutes. In this manner, a polyamide layer is formed on the microporous support. The thickness of the resulting polyamide layer is generally about 0.05 to 1.0 um, preferably about 0.15 to 0.5 um.

The following examples are provided for illustrative purposes only and are in no way intended to limit the scope of the present invention. Unless otherwise indicated below, all percentages (%) of ingredients are percent by weight (i.e., wt/wt %).

PREPARATION EXAMPLE A 5-chloroformyl isophthaloyl chloride (5CFIPC) was prepared by adding a solution of 32.4 g (0.178 mole) of 5-hydroxy isophthalic acid and 31 g (0.356 mole) N,N-dimethyl acetamide in 300 ml tetrahydrofuran (THF) over 15 minutes from an addition funnel to a stirring solution of 580 g (1.17 moles) of 20% phosgene in toluene in a 2-liter round bottom flask which had been kept at −15° C. and fitted with HCl gas trap. The addition was carried out over 15 minutes.

After HCl outgassing had subsided, 67.8 g (0.559 mole) of N,N-dimethyl aniline were added. Subsequently, 200 ml THF was added to help solution stirring and the solution was allowed to cool to −10° C. Stirring was continued at −10° C. for 20 minutes and after gas bubbling had ceased, the chill bath was removed and stirring continued for 2.5 hours. The reaction flask was warmed to approximately 30° C. and maintained at that point for 45 minutes. The temperature was then maintained at approximately 25° C. for an additional 30 minutes. HCl gas was bubbled into the reaction solution for 15 minutes to precipitate any free base N,N-dimethylaniline; an ice bath was added to lower the temperature to 20° C. Stirring was then stopped.

The reaction solution had two phases; the top was a clear amber-color liquid, the bottom a whitish solid. This mixture was vacuum filtered to remove any solids and the resulting filtrate was rotary evaporated. When the volume was reduced to approximately 600 ml, the reaction product was extracted with 3×300 ml heptane. The heptane extracts were filtered to remove the precipitate which formed and the filtrate was rotary evaporated under high vacuum at 25° C. to a slightly-yellow crystalline mass of 13.6 g. Soluble compound was extracted in 200 ml heptane; this extraction was repeated twice. The extracts were combined and suction filtered yielding a colorless solution of 7.3 g of 5CFIPC. This solution was further diluted with heptane to provide stock solutions.

PREPARATION EXAMPLE B 1,3,5-phenyl trichloroformate (PTCF) was prepared by adding a solution containing 250 g of 12.5% phosgene in benzene at $-10°$ C. to a solution of 12 g of phloroglucinol and 11.8 g sodium hydroxide in 300 ml water in a 1-liter round bottom flask fitted with a HCl trap. The addition time was 1 hour. The cloudy-white reaction solution was allowed to warm gradually to 30° C. over the next 6.5 hours.

The two-phase solution was separated into aqueous and organic fractions and the aqueous fraction washed with 2×150 ml portions of toluene. The organic fractions were combined, dried over 20-40 mesh $CaSO_4$ and coarse filtered. This clear, colorless solution was evaporated under a vacuum of 0.5 mm Hg at 25° C. yielding 2.9 g of the crude product. This product was extracted with 3×200 ml heptane. The final yield was 2.4 g PTCF product in solution.

EXAMPLES 1-8

Eight different membranes (Examples 1-8) were prepared according to the present invention using the so-called "machine" method using 5-chloroformyl isophthaloylchloride (5CFIPC), prepared as described in Example A above, as the sole amine-reactive reactant. A polysulfone ultra filter microporous support was mounted in a 6"×6" TEFLON ® (duPont) frame, soaked with deionized water, and the excess surface water was blown off with air. A soft cloth sheet was dipped into a polyamine solution and applied to the polysulfone support. The support surface was drained for a total of 46 seconds. The excess amine solution was wiped off with a rubber wiper blade and drained diagonally for an additional 21 seconds.

In each of the Examples 1-5, the amine solution contained 2 wt % metaphenylenediamine (MPD), 3.3% or 6.6 wt % triethylamine camphorsulfonic acid salt (TEACSA) and 0.1 wt % sodium dodecylbenzyl sulfonate (SDBS) surfactant which was adjusted to a pH of 6.5 or 7.5 with HCl. Approximately 50 ml of an aromatic chloroformate solution in ISOPAR ® (an isoparaffin mixture from Exxon Corp.) solvent containing the aromatic chloroformate set forth in Table I was then poured onto the liquid layer of polyamine solution and allowed to remain for a contact time of 3 to 12 seconds. The chloroformate solution was then drained off vertically for 2 minutes, and the composite membrane was finally dried in an air oven for six minutes at 100° C.

A sixth pilot plant membrane (Example 6) was prepared using essentially the method of Examples 1-5 described above, except that the polyamine-coated substrate was passed upside down into a trough of the aromatic chloroformate solution and was supported on its backside by a roller. In Example 6, the aqueous polyamine solution contained 2 wt % MPD, 6.6 wt % TEACSA and 0.15 wt % SDBS adjusted to a pH of 7.5.

Examples 7 and 8 were prepared by the method of Examples 1-5 described above, except that the 5CFIPC solution was 0.15 wt/vol % and the amine solution contained 6.6 wt/vol % TEACSA or no TEACSA for comparison.

The performance of the resulting water permeable membranes was measured by passing an aqueous solution containing about 2,000 ppm of NaCl (pH 7.0), simulating brackish water, through each membrane at 225 psig. Simulated seawater testing was carried out similarly except that approximately 33,000 ppm NaCl aqueous solution and 800 psig applied pressure were employed. Performance results listed were in general obtained after approximately 16 hours of testing. The salt rejection and flux rate for each of the membranes are also set forth in Table I.

TABLE I

| | 5CFIPC MEMBRANES | | | | | | | |
|---|---|---|---|---|---|---|---|---|
| EX. NO. | 1 | 2 | 3 | 4 | 5 | 6 | 7 | 8 |
| 5CFIPC (wt/vol %) | 0.10% | 0.10% | 0.10% | 0.10% | 0.10% | 0.25% | 0.15% | 0.15% |
| MPD | 2.0% | 2.0% | 2.0% | 2.0% | 2.0% | 2.0% | 2.0% | 2.0% |
| TEACSA | 6.6% | 6.6% | 6.6% | 6.6% | 3.3% | 6.6% | 6.6% | — |
| SURFACTANT | 0.10% | 0.10% | 0.10% | 0.10% | 0.10% | 0.15% | 0.10% | 0.10% |
| pH | 6.5 | 7.5 | 7.5 | 7.5 | 7.5 | 7.5 | 7.5 | 7.5 |
| FEED | Brackish | Brackish | Brackish | | | Brackish | Brackish | Brackish |
| REJECTION (%) | 99.85 | 99.68 | 99.91 | | | 99.71 | 99.82 | 99.33 |
| FLUX (GFD) | 15.2 | 18.2 | 16.5 | | | 11.8 | 12.6 | 2.5 |
| FEED | Seawater | | | Seawater | Seawater | | | |
| REJECTION (%) | 99.88 | | | 99.84 | 99.86 | | | |
| FLUX (GFD) | 15.6 | | | 17.4 | 14.7 | | | |
| AROMATIC CHLOROFORMATE CONTACT TIME | 6 sec. | 3 sec. | 12 sec. | 12 sec. | 6 sec. | 6 sec. | 6 sec. | 6 sec. |

EXAMPLES 9-11

Three different membranes containing 5CFIPC as one component of a mixture of amine-reactive reactants were prepared by the method used for Examples 1-5. The identity and the amount of each of the components of the polyamine and chloroformate/acyl halide (OCOCl/COCl) solutions are set forth in Table II. The three membranes were tested in the same manner as in Examples 1-8, and the salt rejection and flux rates are also set forth in Table II.

TABLE II

| | 5CFIPC - MIXED COCL MEMBRANES | | |
|---|---|---|---|
| EX. NO. | 9 | 10 | 11 |
| Total OCOCl/COCL (wt/vol %) | 0.1 | 0.1 | 0.18 |
| 5CFIPC  } relative % | 50 | 80 | 8.9 |
| CPTC    } of | 50 | 20 | 28.3 |

TABLE II-continued

| | 5CFIPC - MIXED COCL MEMBRANES | | |
|---|---|---|---|
| EX. NO. | 9 | 10 | 11 |
| IPC OCOCl/COCl | — | — | 62.8 |
| MPD | 2.5 | 2.5 | 2.5 |
| TEACSA | 5.78% | 5.78% | 5.78% |
| SURFACTANT | 0.125% SDBS | 0.125% SDBS | 0.125% SDBS |
| pH | 7.5 | 7.5 | 7.5 |
| FEED | Brackish | Brackish | Brackish |
| REJECTION % | 99.83 | 99.86 | 99.78 |
| FLUX (GFD) | 28.6 | 19.2 | 23.7 |

EXAMPLES 12-16

Five different membranes containing 1,3,5-phenyltrichloroformate (PTCF), prepared as described in Example B above, as the sole amine-reactive reactant were prepared by a method similar to that used for Examples 1-5. In Examples 12, 13, and 14, PTCF was present at 0.15 wt/vol %. In Example 13, the machine method was modified to include a Freon ® (duPont) rinse with no baking after the aromatic chloroformate contact. The membrane produced was soaked in deionized water until tested. In Example 14, TEACSA was present at 13.2 wt % and the surfactant was present at 0.15 wt %. In Example 16, no TEACSA was present. The resulting membranes were tested in the same manner as in Examples 1-8, and the salt rejection and flux rates are set forth in Table III.

TABLE III

| | PURE PTCF MEMBRANE EXAMPLES | | | | |
|---|---|---|---|---|---|
| EX. NO. | 12 | 13 | 14 | 15 | 16 |
| PTCF (wt/vol %) | 0.15% | 0.15% | 0.15% | 0.10% | 0.10% |
| MPD | 2.0% | 2.0% | 2.0% | 2.0% | 2.0% |
| TEACSA | 6.6% | 6.6% | 13.2% | 6.6% | — |
| SURFACTANT | 0.1% SDBS | 0.1% SDBS | 0.15% SDBS | 0.1% SDBS | 0.1% SDBS |
| pH | 7.5 | 7.5 | 7.5 | 7.5 | 7.5 |
| FEED | Brackish | Brackish | | Brackish | Brackish |
| REJECTION % | 99.36 | 99.78 | | 96.64 | 96.19 |
| FLUX (GFD) | 1.8 | 1.6 | | 3.4 | 0.6 |
| FEED | | Seawater | Seawater | | |
| REJECTION % | | 99.70 | 99.64 | | |
| FLUX (GFD) | | 3.1 | 2.5 | | |
| METHOD | Machine | Modified Machine | Machine | Machine | Machine |

EXAMPLES 17-18

Two different membranes containing PTCF and CPTC as the amine-reactive reactants were prepared by a method similar to that used in Examples 1-5, with the exception that TEACSA was present at 9.9 wt %. The identity and the amount of each of the components of the polyamine and chloroformate/acyl halide (OCOCl-/COCl) solutions are set forth in Table IV. The two membranes were tested in the same manner as in Examples 1-8, and the salt rejection and flux rates are also set forth in Table IV.

TABLE IV

| | PTCF - MIXED COCl | |
|---|---|---|
| EX. NO. | 17 | 18 |
| Total OCOCl/COCl (wt/vol %) | 0.16 | 0.16 |
| PTCF relative % of OCOCl/COCl | 50 | 75 |
| CPTC | 50 | 25 |
| MPD | 2% | 2% |
| TEACSA | 9.9% | 9.9% |
| SURFACTANT | 0.1% SDBS | 0.1% SDBS |
| pH | 7.5 | 7.5 |
| FEED | Brackish | Brackish |
| REJECTION % | 99.89 | 99.92 |
| FLUX (GFD) | 12.0 | 5.1 |
| FEED | Seawater | Seawater |
| REJECTION % | 99.76 | 99.92 |
| FLUX (GFD) | 17.0 | 8.2 |
| METHOD | Machine | Machine |

The above Examples also show the effect of using a cycloaliphatic acyl halide and/or an aromatic polyfunctional acyl halide in addition to or as replacement for part of the cyclic chloroformates. In particular, the presence of the polyfunctional cycloaliphatic and/or aromatic acyl halide appears to not significantly affect the rate of salt rejection, but does appear to increase the flux rates.

The advantage in using a monomeric amine salt (e.g., TEACSA) in the reaction mixture can be seen from comparative Examples 7-8 and 15-16. Thus, the flux rate was considerably lower where the amine salt was absent (Examples 8 and 16) than the flux rate in membranes prepared with the amine salt present (Examples 7 and 15).

The present invention may be embodied in other specific forms without departing from the spirit or essential attributes thereof and, accordingly, reference should be made to the appended claims, rather than to the foregoing specification, as indicating the scope of the invention.

I claim:

1. A water permeable membrane prepared by interfacially polymerizing, on a microporous support, (1) an essentially monomeric polyamine reactant having at least two amine functional groups per reactant molecule, and (2) an essentially monomeric amine-reactive reactant comprising an at least trifunctional cyclic chloroformate, or mixture thereof, wherein at least two of the functional groups are chloroformyl group and the remaining functional groups, if any, of the amine-reactive reactant are acyl halide groups.

2. The water permeable membrane as claimed in claim 1 wherein polymerization occurs in the presence of a monomeric amine salt.

3. The water permeable membrane as claimed in claim 1, wherein said water permeable membrane is produced by the process comprising the steps of:
   (a) coating a microporous support with an aqueous solution comprising an essentially monomeric polyamine reactant having at least two amine functional groups to form a liquid layer on said microporous support;
   (b) contacting said liquid layer with an organic solvent solution of an essentially monomeric amine-reactive reactant comprising said cyclic chloroformate or mixture thereof; and
   (c) drying the product of step (b) so as to form said water permeable membrane.

4. The water permeable membrane as claimed in claim 3, wherein said aqueous polyamine solution also contains a monomeric amine salt.

5. The water permeable membrane as claimed in claim 1, wherein said water permeable membrane is produced by the process comprising the steps of:
   (a) coating a microporous support with a first aqueous solution comprising a monomeric amine salt to form a monomeric amine salt layer on said microporous support;
   (b) coating said monomeric amine salt layer with a second aqueous solution comprising an essentially monomeric polyamine reactant having at least two amine functional groups to form a liquid layer on said monomeric amine salt layer;
   (c) coating said liquid layer with an organic solvent solution of an essentially monomeric amine-reactive reactant comprising said cyclic chloroformate or mixture thereof; and
   (d) drying the product of step (c) so as to form said water permeable membrane.

6. The water permeable membrane as claimed in claim 1, wherein said monomeric amine salt is represented by formula (I) or (II):

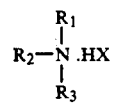

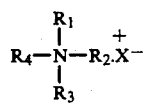

wherein $R_1$, $R_2$, $R_3$ and $R_4$, which may be the same or different, each represents a hydrocarbon; X represents a member selected from the group consisting of a halide, a nitrate, a sulfate, a phosphate, a sulfonate, a carboxylate, a halogenated carboxylate and an oxygenated haloacid derivative; and HX represents a strong acid which forms a water soluble salt with

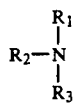

7. The water permeable membrane as claimed in claim 1, wherein said amine functional groups are primary amine functional groups.

8. The water permeable membrane as claimed in claim 1, wherein said polyamine reactant is at least one member selected from the group consisting of an aromatic primary diamine and substituted derivatives thereof; an aromatic primary triamine; an aromatic secondary diamine; a cycloaliphatic primary diamine; a cycloaliphatic secondary diamine; and a xylylene primary diamine.

9. The water permeable membrane as claimed in claim 1, wherein the cyclic nucleus of said cyclic chloroformate is selected from the group consisting of aromatic, heterocyclic, cycloaliphatic, and mixtures thereof.

10. The water permeable membrane as claimed in claim 1, wherein the cyclic nucleus of said cyclic chloroformate comprises a four, five or six-membered single ring nucleus.

11. The water permeable membrane as claimed in claim 1, wherein the cyclic nucleus of said cyclic chloroformate comprises a multi-ring nucleus.

12. The water permeable membrane as claimed in claim 9, wherein said aromatic chloroformate is selected from the group consisting of 3,5-dichloroformyl benzoylchloride, 1,3,5-phenyltrichloroformate and mixtures thereof.

13. The water permeable membrane as claimed in claim 1, wherein up to about 92 weight percent of said cyclic chloroformate is replaced by one or more aromatic acyl halides and/or cycloaliphatic acyl halides.

14. The water permeable membrane as claimed in claim 13, wherein said aromatic acyl halide is selected from the group consisting of isophthaloylchloride, trimesoylchloride, terephthaloylchloride, and mixtures thereof.

15. The water permeable membrane as claimed in claim 13, wherein said cycloaliphatic acyl halide is selected from the group consisting of 1,2,3,4-cyclobutane tetracarboxylic acid chloride, 1,2,3-cyclobutane tricarboxylic acid chloride, 1,2,3,4-cyclopentane tetracarboxylic acid chloride, 1,2,4-cyclopentane tricarboxylic acid chloride, cyclohexane-1,3,5-tricarbonyl chloride, and mixtures thereof.

16. A method for desalination of brackish water or sea water comprising passing the water under pressure through a membrane according to claim 1.

17. A water permeable membrane prepared by interfacially polymerizing on a microporous support (1) metaphenylenediamine and (2) 1,3,5-phenyltrichloroformate in the presence of (3) the amine salt of triethylamine and camphorsulfonic acid.

18. A method for desalination of brackish water or sea water comprising passing the water under pressure through a membrane according to claim 17.

19. A process for producing a water permeable membrane comprising interfacially polymerizing, on a microporous support, (1) an essentially monomeric polyamine reactant having at least two amine functional groups per reactant molecule, and (2) an essentially monomeric amine-reactive reactant comprising an at least trifunctional cyclic chloroformate or mixture thereof, wherein at least two of the functional groups are chloroformyl groups and the remaining functional groups, if any, of the amine-reactive reactant are acyl halides.

20. The process as claimed in claim 19, wherein polymerization occurs in the presence of a monomeric amine salt.

21. The process as claimed in claim 19, wherein said water permeable membrane is produced by the process comprising the steps of:
(a) coating a microporous support with an aqueous solution comprising an essentially monomeric polyamine reactant having at least two amine functional groups to form a liquid layer on said microporous support;
(b) contacting said liquid layer with an organic solvent solution of an essentially monomeric amine-reactive reactant comprising said cyclic chloroformate or mixture thereof; and
(c) drying the product of step (b) so as to form said water permeable membrane.

22. The process as claimed in claim 21, wherein said aqueous polyamine solution also contains a monomeric amine salt.

23. The process as claimed in claim 19, wherein said water permeable membrane is produced by the process comprising the steps of:
(a) coating a microporous support with a first aqueous solution comprising a monomeric amine salt to form a monomeric amine salt layer on said microporous support;
(b) coating said monomeric amine salt layer with a second aqueous solution comprising an essentially monomeric polyamine reactant having at least two amine functional groups to form a liquid layer on said monomeric amine salt layer;
(c) coating said liquid layer with an organic solvent solution of an essentially monomeric amine-reactive reactant comprising said cyclic chloroformate or mixture thereof; and
(d) drying the product of step (c) so as to form said water permeable membrane.

24. The process as claimed in claim 19, wherein said monomeric amine salt is represented by formula (I) or (II):

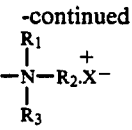
(I)

-continued
(II)

wherein $R_1$, $R_2$, $R_3$ and $R_4$, which may be the same or different, each represents a hydrocarbon; X represents a member selected from the group consisting of a halide, a nitrate, a sulfate, a phosphate, a sulfonate, a carboxylate, a halogenated carboxylate and an oxygenated haloacid derivative; and HX represents a strong acid which forms a water soluble salt with

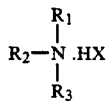

25. The process as claimed in claim 19, wherein said amine functional groups are primary amine functional groups.

26. The process as claimed in claim 19, wherein said polyamine reactant is at least one member selected from the group consisting of an aromatic primary diamine and substituted derivatives thereof; an aromatic primary triamine; an aromatic secondary diamine; a cycloaliphatic primary diamine; a cycloaliphatic secondary diamine; and a xylylene primary diamine.

27. The process as claimed in claim 19, wherein said cyclic chloroformate is selected from the group consisting of 3,5-dichloroformyl benzoylchloride, 1,3,5-phenyltrichloroformate, and mixtures thereof.

28. The process as claimed in claim 19, wherein up to about 92 weight percent of said cyclic chloroformate is replaced by an essentially monomeric, polyfunctional aromatic acyl halide and/or polyfunctional cycloaliphatic acyl halide.

29. The process as claimed in claim 28, wherein said aromatic acyl halide is selected from the group consisting of isophthaloylchloride, trimesoylchloride, terephthaloylchloride, and mixtures thereof.

30. The process as claimed in claim 28, wherein said cycloaliphatic acyl halide is selected from the group consisting of 1,2,3,4-cyclobutane tetracarboxylic acid chloride, 1,2,3-cyclobutane tricarboxylic acid chloride, 1,2,3,4-cyclopentane tetracarboxylic acid chloride, 1,2,4-cyclopentane tricarboxylic acid chloride, cyclohexane-1,3,5-tricarbonyl chloride, and mixtures thereof.

31. A process for preparing a water permeable membrane comprising interfacially polymerizing on a microporous support (1) metaphenylene diamine and (2) 1,3,5-phenyltrichloroformate in the presence of (3) triethylene camphorsulfnoic acid salt.

* * * * *

UNITED STATES PATENT AND TRADEMARK OFFICE
CERTIFICATE OF CORRECTION

PATENT NO. : 5,246,587
DATED : September 21, 1993
INVENTOR(S) : John E. Tomaschke It is certified that error appears in the above-identified patent and that said Letters Patent is hereby corrected as shown below:

Column 2, line 21, "Zupanic" should read --Zupancic--.
Column 7, lines 59 and 60, "0 25 wt %" should read --0.25 wt %--. Column 8, line 29, "1.0 um" should read --1.0 µm--, and "0.5 um" should read --0.5µm--. Column 16, lines 54 and 55, "triethylene" should read --triethylamine--.

Signed and Sealed this

Fifth Day of April, 1994

Attest:

BRUCE LEHMAN

Attesting Officer  Commissioner of Patents and Trademarks